US012766866B2

(12) United States Patent
Funakoshi et al.

(10) Patent No.: US 12,766,866 B2
(45) Date of Patent: Oct. 20, 2026

(54) INKJET RECORDING APPARATUS AND INKJET RECORDING METHOD

(71) Applicant: KYOCERA DOCUMENT SOLUTIONS INC., Osaka (JP)

(72) Inventors: Daichi Funakoshi, Osaka (JP); Yukari Kida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 78 days.

(21) Appl. No.: 19/075,705

(22) Filed: Mar. 10, 2025

(65) Prior Publication Data

US 2025/0282167 A1 Sep. 11, 2025

(30) Foreign Application Priority Data

Mar. 11, 2024 (JP) ................................ 2024-037318

(51) Int. Cl.

| | |
|---|---|
| ***B41J 2/21*** | (2006.01) |
| ***B41J 11/00*** | (2006.01) |
| ***B41M 5/00*** | (2006.01) |
| ***B41M 5/52*** | (2006.01) |
| ***C09D 11/322*** | (2014.01) |

(52) U.S. Cl.

CPC .......... *B41M 5/0017* (2013.01); *B41J 2/2114* (2013.01); *B41J 11/0015* (2013.01); *B41M 5/0011* (2013.01); *B41M 5/0047* (2013.01); *B41M 5/5281* (2013.01); *C09D 11/322* (2013.01)

(58) Field of Classification Search

CPC ... B41J 2/2114; B41J 11/0015; B41M 5/0011; B41M 5/0017

See application file for complete search history.

(56) References Cited

U.S. PATENT DOCUMENTS

2004/0141041 A1* 7/2004 Tsutsumi ............... B41J 2/2056 347/102
2020/0224048 A1* 7/2020 Furukawa .................. B41J 2/01

FOREIGN PATENT DOCUMENTS

EP 4410565 A1 * 8/2024 ............ B41M 3/008
JP 202198284 A 7/2021

* cited by examiner

*Primary Examiner* — Scott A Richmond

(74) *Attorney, Agent, or Firm* — Li & Cai Intellectual Property Office

(57) ABSTRACT

An inkjet recording apparatus includes: a pre-treatment head that ejects a pre-treatment liquid onto a recording medium; and a recording head that ejects an ink onto at least part of a region of the recording medium onto which the pre-treatment liquid has been ejected. The recording medium has a surface roughness of 0.30 μm or more and 0.40 μm or less. The pre-treatment liquid includes an aqueous medium and a resin. A content ratio of the resin in the pre-treatment liquid is 10 mass % or more and 30 mass % or less.

7 Claims, 2 Drawing Sheets

INKJET RECORDING APPARATUS AND INKJET RECORDING METHOD

CROSS-REFERENCE TO RELATED PATENT APPLICATION

This application claims the benefit of Japanese Priority Patent Application JP 2024-037318 filed Mar. 11, 2024, the entire contents of which are incorporated herein by reference.

FIELD OF THE DISCLOSURE

The present disclosure relates to an inkjet recording apparatus and an inkjet recording method.

BACKGROUND OF THE DISCLOSURE

There is a need for a technology for printing on a non-absorbent recording medium such as a packaging material, a label, and a film. For example, there is a recording medium that includes a stacked body including a printing layer and a first base material. The surface of the first base material is, for example, a surface resin layer. The surface resin layer has a surface roughness (Ra) of, for example, 0.5 μm to 2.0 μm based on Japanese Industrial Standard (JIS) B-0601.

SUMMARY OF THE DISCLOSURE

An inkjet recording apparatus according to the present disclosure includes: a pre-treatment head that ejects a pre-treatment liquid onto a recording medium; and a recording head that ejects an ink onto at least part of a region of the recording medium onto which the pre-treatment liquid has been ejected. The recording medium has a surface roughness of 0.30 μm or more and 0.40 μm or less. The pre-treatment liquid includes an aqueous medium and a resin. A content ratio of the resin in the pre-treatment liquid is 10 mass % or more and 30 mass % or less.

An inkjet recording method according to the present disclosure include: a pre-treatment step of ejecting a pre-treatment liquid onto a recording medium; and an ink ejection step of ejecting an ink onto at least part of a region of the recording medium onto which the pre-treatment liquid has been ejected. The recording medium has a surface roughness of 0.3 μm or more and 0.4 μm or less. The pre-treatment liquid includes an aqueous medium and a resin. A content ratio of the resin in the pre-treatment liquid is 10 mass % or more and 30 mass % or less.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Figure 1:
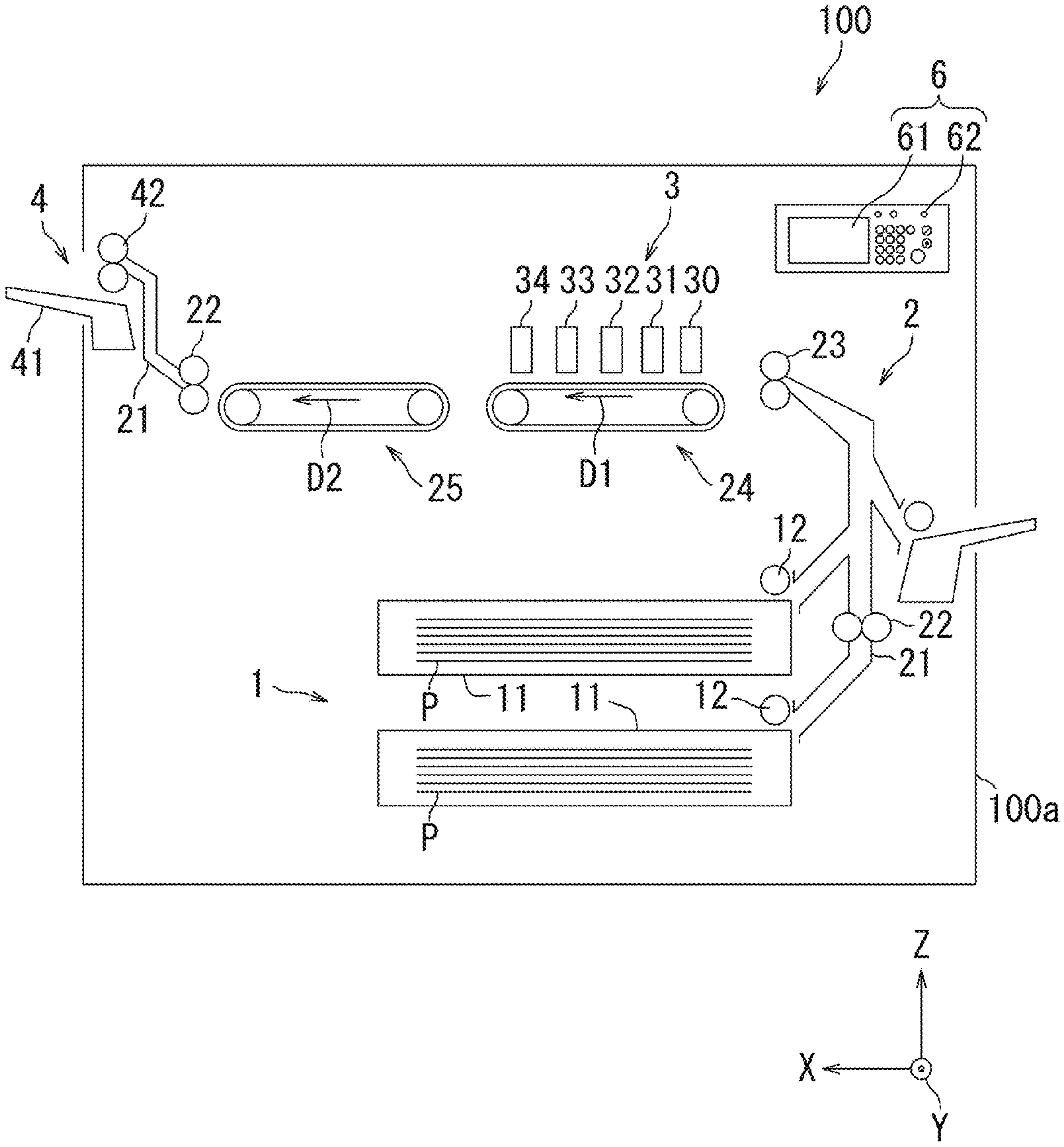
FIG. 1 is a diagram showing an example of an inkjet recording apparatus according to an embodiment of the present disclosure.

Embodiments of the present disclosure will be described below. Note that in the following, unless otherwise specified, the measured value of the volume median diameter (D50) is a value measured using a dynamic light scattering particle size distribution analyzer ("Zetasizer (registered trademark) Nano ZS" manufactured by Spectris). The components described in the present specification may each be used alone, or two or more of them may be used in combination.

First Embodiment: Inkjet Recording Apparatus

An inkjet recording apparatus according to a first embodiment of the present disclosure will be described below. The inkjet recording apparatus according to the present disclosure includes: a pre-treatment head; and a recording head. The pre-treatment head ejects a pre-treatment liquid onto the recording medium. The recording head ejects an ink onto at least part of a region of the recording medium onto which the pre-treatment liquid has been ejected. The recording medium has a surface roughness of 0.30 μm or more and 0.40 μm or less. The pre-treatment liquid includes an aqueous medium and a resin. A content ratio of the resin in the pre-treatment liquid is 10 mass % or more and 30 mass % or less. Hereinafter, the "resin included in the pre-treatment liquid" will be referred to as a pre-treatment resin in some cases.

By having the above-mentioned configuration, the inkjet recording apparatus according to the present disclosure is capable of forming an image that has a high gloss value and contrast ratio and excellent adhesion (base material adhesion) to a recording medium. The reasons for this are presumed to be as follows.

The recording medium used in the inkjet recording apparatus according to the present disclosure has a surface roughness of 0.30 μm or more and 0.40 μm or less, and has moderate recesses and projections on the surface thereof. The recesses and projections cause the recording medium and the pre-treatment liquid ejected onto the recording medium to come into close contact with each other, thereby improving the base material adhesion.

Meanwhile, the larger the recesses and projections on the surface of the recording medium (the larger the value of the surface roughness), the lower the gloss value of the image formed on the recording medium tends to be. In this regard, in the present disclosure, the content ratio of the pre-treatment resin in the pre-treatment liquid is set to 10 mass % or more. When the content ratio of the pre-treatment resin is 10 mass % or more, the appropriate amount of pre-treatment resin ejected onto the recording medium flows into the recessed portion on the surface of the recording medium, and the recesses and projections on the surface of the recording medium become smaller to some extent. As a result, the gloss value of the image formed on the recording medium increases.

Meanwhile, the smaller the recesses and projections on the surface of the recording medium (the smaller the value of the surface roughness), the lower the contrast ratio of the image formed on the recording medium tends to be. In this regard, in the present disclosure, the content ratio of the pre-treatment resin in the pre-treatment liquid is set to 30 mass % or less. When the content ratio of the pre-treatment resin is 30 mass % or less, the pre-treatment resin ejected onto the recording medium does not excessively flow into the recessed portion on the surface of the recording medium, and the recesses and projections on the surface of the recording medium do not become excessively smaller. As a result, the contrast ratio of the image formed on the recording medium increases.

From the above, the inkjet recording apparatus according to the present disclosure is capable of forming an image that has a high gloss value and contrast ratio and excellent base material adhesion.

The surface resin layer of the stacked body disclosed in Japanese Patent Application Laid-open No. 2021-98284 has a rough surface, so that the gloss value of the printed image tends to below. On the other hand, in accordance with the above inkjet recording apparatus, it is possible to form an image that has a high gloss value and contrast ratio and excellent adhesion to a recording medium.

<Recording Medium>

As described above, the recording medium has a surface roughness of 0.30 μm or more and 0.40 μm or less. In order to form an image having excellent base material adhesion, the recording medium favorably has a surface roughness of 0.32 μm or more. In order form an image having a high gloss value, the recording medium favorably has a surface roughness of 0.38 μm or less.

The inkjet recording apparatus according to the present disclosure is suitable for forming an image on a non-absorbent recording medium. The recording medium is suitably a non-absorbent recording medium. The non-absorbent recording medium is inferior to an absorbent recording medium in terms of absorption of an ink (particularly, a water-based ink). In the non-absorbent recording medium, the absorption amount of the aqueous medium is, for example, 1.0 g/m2 or less. Examples of the non-absorbent recording medium include a recording medium formed of a resin, a recording medium formed of a metal, and a recording medium formed of glass.

The resin included in the recording medium formed of a resin is favorably a thermoplastic resin. Specific examples of the resin include polyethylene terephthalate (PET), polypropylene, polyethylene, and polyvinyl chloride. In order to form an image having excellent base material adhesion, as the resin included in the recording medium formed of a resin, PET and polypropylene are favorable and PET is more favorable.

Examples of the recording medium formed of a resin include a resin sheet and a resin film. Examples of the resin sheet include a polypropylene sheet and a PET sheet, more specifically, a biaxially oriented polypropylene (OPP) sheet and a biaxially oriented PET sheet. Examples of the resin film include a polypropylene film and a PET film, more specifically an OPP film and a biaxially oriented PET film. In the case where an image is formed on the recording medium formed of a resin by the inkjet recording apparatus according to the present disclosure, the surface (print surface) of the recording medium may be subjected to corona discharge treatment.

<Pre-Treatment Liquid>

By ejecting the pre-treatment liquid onto the recording medium, it is possible to form an image having excellent base material adhesion. The pre-treatment liquid to be ejected from the pre-treatment head included in the inkjet recording apparatus according to the present disclosure includes an aqueous medium and a pre-treatment resin. The pre-treatment liquid may further include, as necessary, a surfactant and at least one of other components. Note that an ink described below includes a pigment, but the pre-treatment liquid does not necessarily need to include a pigment.

As described above, the content ratio of the pre-treatment resin in the pre-treatment liquid is 10 mass % or more and 30 mass % or less. In order form an image having a high gloss value, the content ratio of the pre-treatment resin in the pre-treatment liquid is favorably 15 mass % or more, more favorably 20 mass % or more. In order to form an image having a high contrast ratio, the content ratio of the pre-treatment resin in the pre-treatment liquid is favorably 25 mass % or less.

The pre-treatment resin impacted on the recording medium from the pre-treatment head forms a pre-treatment resin film on the recording medium. The pre-treatment resin impacted on the recording medium from the pre-treatment head flows into the recessed portion, of the recesses and projections on the surface of the recording medium, thereby filling at least part of the recessed portion. For this reason, the thickness of the pre-treatment resin film present in the recessed portion, of the recesses and projections on the surface of the recording medium, is larger than that of the pre-treatment resin film present on the projecting portion. By adjusting the amount of the pre-treatment resin filling at least part of the recessed portion, it is possible to adjust the gloss value and the contrast ratio of the image formed on the recording medium within a desired range.

The amount (ejection amount) of the pre-treatment liquid ejected from the pre-treatment head is favorably 0.1 pL or more and 10 pL or less per pixel, more favorably 0.5 pL or more and 5 pL or less, and still more favorably 1 pL or more and 3 pL or less. The amount (ejection amount) of the pre-treatment resin ejected from the pre-treatment head is favorably 0.2 pL or more and 0.6 pL or less per pixel. In order form an image having a high gloss value, the ejection amount of the pre-treatment resin ejected from the pre-treatment head is favorably 0.3 pL or more per pixel, more favorably 0.5 pL or more. In order to form an image having a high contrast ratio, the ejection amount of the pre-treatment resin ejected from the pre-treatment head is favorably 0.2 pL or less per pixel. The ejection amount per pixel of the pre-treatment resin ejected from the pre-treatment head is obtained from the formula "Ejection amount of pre-treatment resin per pixel (pL)=ejection amount of pre-treatment liquid ejected from pre-treatment head per pixel (pL)× content ratio of pre-treatment resin in pre-treatment liquid (mass %)/100".

(Pre-Treatment Resin)

Examples of the pre-treatment resin include a urethane resin, a polystyrene resin, an acrylic resin, an olefin resin (more specifically, a polyethylene resin and a polypropylene resin), a vinyl resin (more specifically, a vinyl chloride resin, polyvinylalcohol, a vinyl ether resin, and an N-vinyl resin), a polyester resin, a polyamide resin, and copolymers of these resins (more specifically, a styrene acrylic resin, a styrene-butadiene copolymer). The polarity of the pre-treatment resin is, for example, anionic. However, the polarity of the pre-treatment resin may be nonionic or cationic.

The pre-treatment resin is favorably uniformly dispersed in the pre-treatment liquid. In order to optimize the ejectability of the pre-treatment liquid from the pre-treatment head and the preservation stability of the pre-treatment liquid, the pre-treatment resin is favorably in the form of particles in the pre-treatment liquid, more favorably in the form of emulsified particles. In the case where the pre-treatment resin is in the form of emulsified particles, the pre-treatment resin may be a self-emulsifying resin or forced emulsifying resin. The self-emulsifying resin is a hydrophilic resin having a hydrophilic group or hydrophilic segment and is self-dispersed in the pre-treatment liquid. The forced emulsifying resin is a hydrophobic resin and is forcibly emulsified by a surfactant in the pre-treatment liquid.

As the pre-treatment resin, a urethane resin is favorable and a self-emulsifying urethane resin is more favorable. The pre-treatment resin is favorably a urethane resin in the form of emulsified particles. Examples of the urethane resin include a urethane resin having an ester bond and an ether bond in its molecular chain (isocyanate ester/ether urethane resin), a urethane resin having an ether bond in its molecular chain (isocyanate ether urethane resin), a urethane resin having an ester bond in its molecular chain (isocyanate ester urethane resin), and a urethane resin having a carbonate bond in its molecular chain (isocyanate carbonate urethane resin). The urethane resin is favorably of non-yellowing because the formed image is less likely to discolor.

In the case where the pre-treatment resin is in the form of particles, the pre-treatment resin particles favorably have a volume median diameter of 1 nm or more and 200 nm or less, more favorably 10 nm or more and 100 nm or less, and still more favorably 20 nm or more and 40 nm or less. When the pre-treatment resin particles have a volume median diameter of 1 nm or more, it is possible to optimize the preservation stability of the pre-treatment liquid. When the pre-treatment resin particles have a volume median diameter of 200 nm or less, it is possible to optimize the ejectability of the pre-treatment liquid from the pre-treatment head. The volume median diameter of the pre-treatment resin particles is measured, for example, by a light scattering method using a grain size distribution measuring apparatus ("NANOTRAC UPA-EX150" manufactured by MicrotracBEL Corp.).

The thermal melting temperature of the pre-treatment resin is favorably 90° C. or more and 200° C. or less, more favorably 100° C. or more and 190° C. or less. The thermal softening temperature of the pre-treatment resin is favorably 50° C. or more and 200° C. or less, more favorably 150° C. or more and 180° C. or less. The glass transition temperature of the pre-treatment resin is favorably −50° C. or more and 120° C. or less, more favorably −40° C. or more and 110° C. or less. The glass transition temperature of the pre-treatment resin is measured, for example, by measuring a measurement film using a dynamic viscoelasticity measuring apparatus ("Rheogel-E4000" manufactured by UBM). The thermal softening temperature and the thermal melting temperature of the pre-treatment resin are obtained, for example, by measuring a measurement film using a flow tester ("CFT-500D" manufactured by SHIMADZU CORPORATION). The measured outflow start temperature is regarded as the thermal softening temperature, and the ½ method temperature is regarded as the thermal melting temperature. The above-mentioned measurement film can be obtained by, for example, preparing a film having a film thickness of 500 μm from the pre-treatment resin and drying the film at room temperature for 15 hours, 80° C. for 6 hours, and 120° C. for 20 minutes.

As the pre-treatment resin, only one type of pre-treatment resin may be used or two or more types of pre-treatment resins may be used. The content ratio of the urethane resin in the pre-treatment resin is favorably 80 mass % or more, more favorably 90 mass % or more, more favorably 95 mass % or more, and still more favorably 100 mass %.

(Aqueous Medium)

The aqueous medium included in the pre-treatment liquid is a medium including water. The aqueous medium may function as a solvent or a dispersion medium. Specific examples of the aqueous medium include an aqueous medium that includes water and a water-soluble organic solvent.

(Water)

In the pre-treatment liquid, the content ratio of water is favorably 60 mass % or more and 75 mass % or less.

(Water-Soluble Organic Solvent)

Examples of the water-soluble organic solvent included in the pre-treatment liquid include a glycol compound, a glycol ether compound, a lactam compound, a nitrogen-containing compound, an acetate compound, thiodiglycol, glycerin, and dimethylsulfoxide.

Examples of the glycol compound include ethylene glycol, 1,3-propanediol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol.

Examples of the glycolether compound include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol dimethyl ether, dipropylene glycol methyl ether, triethylene glycol monomethyl ether, triethylene glycol monoethyl ether, triethylene glycol monobutyl ether (referred to also as butyl triglycol), and propylene glycol monomethyl ether.

Examples of the lactam compound include 2-pyrrolidone and N-methyl-2-pyrrolidone.

Examples of the nitrogen-containing compound include 1,3-dimethylimidazolidinone, formamide, and dimethylformamide.

Examples of the acetate compound include diethylene glycol monoethyl ether acetate.

Suitable examples of the water-soluble organic solvent included in the pre-treatment liquid include a glycol compound and a glycol ether compound. More suitable examples of the water-soluble organic solvent included in the pre-treatment liquid include propylene glycol and triethylene glycol monobutyl ether.

The content ratio of the water-soluble organic solvent in the pre-treatment liquid is favorably 1 mass % or more and 30 mass % or less, more favorably 5 mass % or more and 20 mass % or less.

(Surfactant)

The surfactant optimizes the compatibility and dispersion stability of each component included in the pre-treatment liquid. Further, the surfactant optimizes the wettability of the pre-treatment liquid on the recording medium. As the surfactant in the pre-treatment liquid, a nonionic surfactant is favorable. Examples of the nonionic surfactant that can be included in the pre-treatment liquid include an acetylene glycol surfactant (e.g., a surfactant including an acetylene glycol compound), a silicone surfactant (e.g., a surfactant including a silicone compound), and a fluorosurfactant (e.g., a surfactant including a fluoropolymer or a fluorine-containing compound). Examples of the acetylene glycol surfactant include an ethylene oxide adduct of acetylene glycol and a propylene oxide adduct of acetylene glycol. The pre-treatment liquid favorably includes a silicone surfactant. The content ratio of the surfactant in the pre-treatment liquid is favorably 0.01 mass % or more and 1.00 mass % or less, more favorably 0.03 mass % or more and 0.20 mass % or less.

(Other Components)

The pre-treatment liquid may further include, as necessary, known additives (e.g., a dissolution stabilizer, an anti-drying agent, an antioxidant, a viscosity adjustor, a pH adjuster, and an antifungal agent).

(Method of Preparing Pre-Treatment Liquid)

The pre-treatment liquid can be produced by, for example, uniformly mixing the aqueous medium, the pre-treatment resin, and other components (e.g., the surfactant and at least one of other components) blended as necessary, using a stirrer. In the production of the pre-treatment liquid, after uniformly mixing the respective components, foreign substances and coarse particles may be removed using a filter (e.g., a filter with a pore size of 5 μm or less).

<Ink>

The ink to be ejected from the recording head included in the inkjet recording apparatus according to the present disclosure includes a pigment and an aqueous medium. The ink favorably further includes a pigment coating resin, a binder resin, a surfactant, and at least one of other components.

(Pigment)

In the ink, the pigment forms, for example, a pigment particle together with the pigment coating resin. The pigment particles each include, for example, a core including a pigment and a pigment coating resin covering the core. The pigment coating resin is present to be, for example, dispersed in a solvent. From the viewpoint of optimizing the color density, hue, and stability of the ink, the volume median diameter of the pigment particle is favorably 30 nm or more and 200 nm or less, more favorably 70 nm or more and 130 nm or less.

Examples of the pigment include a yellow pigment, an orange pigment, a red pigment, a blue pigment, a purple pigment, a black pigment, and a white pigment. Examples of the yellow pigment include C.I. Pigment Yellow (74, 93, 95, 109, 110, 120, 128, 138, 139, 151, 154, 155, 173, 180, 185, and 193). Examples of the orange pigment include C.I. Pigment Orange (34, 36, 43, 61, 63, and 71). Examples of the red pigment include C.I. Pigment Red (122 and 202). Examples of the blue pigment include C.I. Pigment Blue (15, more specifically 15:3). Examples of the purple pigment include C.I. Pigment Violet (19, 23, and 33). Examples of the black pigment include C.I. Pigment Black (7). Examples of the white pigment include zinc flower, titanium oxide, antimony white, zinc sulfide, a barite powder, barium carbonate, clay, silica, white carbon, talc, calcium carbonate, mica, kaolin, and alumina white. The white pigment is favorable as a pigment and the ink is favorable a white ink including a white pigment because a base image having a high contrast ratio can be formed.

The content ratio of the pigment in the ink is favorably 0.5 mass % or more and 10.0 mass % or less, more favorably 1.0 mass % or more and 5.0 mass % or less. When the content ratio of the pigment is 0.5 mass % or more, it is possible to form an image having desired image density with the ink. Further, when the content ratio of the pigment is 10.0 mass % or less, it is possible to ensure sufficient fluidity of the ink.

(Pigment Coating Resin)

The pigment coating resin is a resin that is soluble in the aqueous medium of the ink. Part of the pigment coating resin is present on, for example, the surface of the pigment particle to optimize the dispersibility of the pigment particle. Part of the pigment coating resin is present to be, for example, dissolved in the aqueous medium of the ink.

The pigment coating resin is favorably anionic. Examples of the pigment coating resin include a styrene acrylic resin, a styrene-maleic acid copolymer, a styrene-maleic acid half ester copolymer, a vinyl naphthalene-acrylic acid copolymer, and a vinyl naphthalene-maleic acid copolymer. The styrene-maleic acid copolymer is favorable as the pigment coating resin because the pigment particle can be suitably dispersed in the ink. Examples of the styrene-maleic acid copolymer include a styrene-maleic anhydride copolymer, more specifically, a polyether-modified styrene-maleic anhydride copolymer.

In the ink, the content ratio of the pigment coating resin is favorably 0.1 mass % or more and 10.0 mass % or less, more favorably 0.5 mass % or more and 5.0 mass % or less. When the content ratio of the pigment coating resin is 0.1 mass % or more and 10.0 mass % or less, it is possible to ensure sufficient ejection stability of the ink.

In the ink, the content of the pigment coating resin with respect to 100 parts by mass of the pigment is favorably 10 parts by mass or more and 200 parts by mass or less, more favorably 50 parts by mass or more and 150 parts by mass or less. When the content of the pigment coating resin is 10 parts by mass or more and 200 parts by mass or less, it is possible to optimize the ejection stability of the ink.

(Binder Resin)

The binder resin enhances the adhesion of the ink to the film formed by the pre-treatment liquid. Examples of the binder resin include resins similar to those described for the pre-treatment resin. The polarity of the binder resin is suitably anionic. When the binder resin is anionic, it is easy for the binder resin to coexist with the pigment particle (e.g., a pigment particle including an anionic pigment coating resin) that is suitably anionic similarly, in the ink. However, the polarity of the binder resin may be nonionic or cationic.

The binder resin is favorably uniformly dispersed in the ink. In order to optimize the ejectability of the pre-treatment liquid from the recording head and the preservation stability of the ink, the binder resin is favorably in the form of particles in the ink, more favorably in the form of emulsified particles. In the case where the binder resin is in the form of emulsified particles, the binder resin may be a self-emulsifying resin or forced emulsifying resin.

As the binder resin, a urethane resin is favorable and a self-emulsifying urethane resin is more favorable. The binder resin is favorably a urethane resin in the form of emulsified particles. Examples of the urethane resin include a urethane resin having an ester bond and an ether bond in its molecular chain (isocyanate ester/ether urethane resin), a urethane resin having an ether bond in its molecular chain (isocyanate ether urethane resin), a urethane resin having an ester bond in its molecular chain (isocyanate ester urethane resin), and a urethane resin having a carbonate bond in its molecular chain (isocyanate carbonate urethane resin). The urethane resin is favorably of non-yellowing because the formed image is less likely to discolor.

In the case where the binder resin is in the form of particles, the volume median diameter of the binder resin particle is favorably 1 nm or more and 200 nm or less, more favorably 10 nm or more and 100 nm or less, and still more favorably 20 nm or more and 40 nm or less. The thermal melting temperature of the binder resin is favorably 90° C. or more and 200° C. or less, more favorably 100° C. or more and 190° C. or less. The thermal softening temperature of the binder resin is favorably 50° C. or more and 200° C. or less, more favorably 150° C. or more and 180° C. or less. The glass transition temperature of the binder resin is favorably −30° C. or more and 120° C. or less, more favorably 30° C. or more and 110° C. or less. The volume median diameter of the binder resin particle and the glass transition temperature, the thermal softening temperature, and the thermal melting temperature of the binder resin are measured in the same manner as those described for the pre-treatment resin, for example.

As the binder resin, only one type of binder resin may be used or two or more types of binder resins may be used. The content ratio of the urethane resin in the binder resin is favorably 80 mass % or more, more favorably 90 mass % or more, more favorably 95 mass % or more, and still more favorably 100 mass %.

The content ratio of the binder resin in the ink is favorably 1.0 mass % or more and 12.0 mass % or less, more favorably 2.0 mass % or more and 6.0 mass % or less. When the content ratio of the binder resin is 1.0 mass % or more, it is possible to optimize the adhesion of the ink to the film formed by the pre-treatment liquid. When the content ratio of the binder resin is 12.0 mass % or less, it is possible to optimize the ejection stability of the ink.

(Aqueous Medium)

The aqueous medium included in the ink is a medium including water. The aqueous medium may function as a solvent or a dispersion medium. Specific examples of the aqueous medium include an aqueous medium that includes water and a water-soluble organic solvent.

(Water)

In the ink, the content ratio of water is favorably 25.0 mass % or more and 80.0 mass % or less, more favorably 40.0 mass % or more and 70.0 mass % or less.

(Water-Soluble Organic Solvent)

Examples of the water-soluble organic solvent included in the ink include solvents similar to those described for the water-soluble organic solvent included in the pre-treatment liquid. Suitable examples of the water-soluble organic solvent included in the ink include a glycol compound and a glycol ether compound. More suitable examples of the water-soluble organic solvent included in the ink include propylene glycol and butyl triglycol. The content ratio of the water-soluble organic solvent in the ink is favorably 10.0 mass % or more and 50.0 mass % or less, more favorably 25.0 mass % or more and 45.0 mass % or less.

(Surfactant)

The surfactant optimizes the compatibility and dispersion stability of each component included in the ink. Further, the surfactant optimizes the wettability of the ink on the recording medium. As the surfactant included in the ink, a nonionic surfactant is favorable. Examples of the nonionic surfactant included in the ink include compounds similar to those described for the nonionic surfactant included in the pre-treatment liquid. The ink favorably includes an acetylene glycol surfactant. The content ratio of the surfactant in the ink is favorably 0.01 mass % or more and 3.00 mass % or less, more favorably 0.03 mass % or more and 1.00 mass % or less.

(Other Components)

The ink may further include, as necessary, known additives (e.g., a dissolution stabilizer, an anti-drying agent, an antioxidant, a viscosity adjustor, a pH adjuster, and an antifungal agent). Examples of the pH adjuster include a strongly basic compound, more specifically lithium hydroxide, sodium hydroxide, and potassium hydroxide. The content ratio of the pH adjuster in the ink is favorably 0.001 mass % or more and 1.000 mass % or less, more favorably 0.002 mass % or more and 0.005 mass % or less.

Note that the ink included in the inkjet recording apparatus according to the present disclosure is, for example, a heat-drying ink (e.g., a non-UV curable ink). However, the ink included in the inkjet recording apparatus according to the present disclosure may be a UV curable ink.

(Method of Producing Ink)

The ink can be produced by, for example, uniformly mixing a pigment dispersion including a pigment, an aqueous medium, and other components (e.g., a pigment coating resin, a binder resin, a surfactant, and at least one of other components) blended as necessary, using a stirrer. In the production of the ink, after uniformly mixing the respective components, foreign substances and coarse particles may be removed using a filter (e.g., a filter with a pore size of 5 μm or less).

(Pigment Dispersion)

The pigment dispersion is a dispersion including a pigment. The pigment dispersion favorably further includes a pigment coating resin. As the dispersion medium of the pigment dispersion, water is favorable. The content ratio of the pigment in the pigment dispersion is favorably 5.0 mass % or more and 70.0 mass % or less, more favorably 10.0 mass % or more and 50.0 mass % or less. The content ratio of the pigment coating resin in the pigment dispersion is favorably 1.0 mass % or more and 10.0 mass % or less, more favorably 2.0 mass % or more and 6.0 mass % or less. The pigment dispersion can be prepared by wet dispersing a pigment, a pigment coating resin, a dispersion medium (e.g., water), and a component added as necessary (e.g., a surfactant) using a media-type wet disperser. In the wet dispersing using the media-type wet disperser, for example, small beads (e.g., beads having D50 of 0.1 mm or more and 1.0 mm or less) can be used as media. The material of the beads is not particularly limited, but a hard material (e.g., glass and zirconia) is favorable.

<Configuration of Inkjet Recording Apparatus>

Next, a configuration of the inkjet recording apparatus according to the present disclosure will be described with reference to the drawings. Note that in the drawings, the same or corresponding portions will be denoted by the same reference symbols and the description thereof will not be repeated.

An inkjet recording apparatus 100 according to a first embodiment, which is an example of the inkjet recording apparatus according to the present disclosure, will be described with reference to FIG. 1. FIG. 1 is a diagram showing an example of the inkjet recording apparatus 100. In FIG. 1, for convenience, the orientation from right to left is the positive orientation of the X-axis, the orientation from back to front is the positive orientation of the Y-axis, and the orientation from bottom to top is the positive orientation of the Z-axis.

As shown in FIG. 1, the inkjet recording apparatus 100 is an apparatus that records an image using a single color ink on a sheet P, and includes a casing **100*a*, a paper feed unit 1, a conveying unit 2, an image forming unit 3, an output unit 4, an operation panel unit 6, the sheet P, a pre-treatment liquid (not shown), and an ink (not shown). The casing 100*a* houses the paper feed unit 1, the conveying unit 2, the image forming unit 3, and the output unit 4**. The sheet P corresponds to an example of the "recording medium".

The paper feed unit 1 houses a plurality of sheets P. The paper feed unit 1 includes a paper feed cassette 11 and a paper feed roller 12. The paper feed cassette 11 houses at least one sheet P. The paper feed roller 12 feeds the sheet P from the paper feed cassette 11 to the conveying unit 2.

The image forming unit 3 forms an image on the sheet P. The image forming unit 3 includes a first heating unit 30, a pre-treatment head 31, a recording head 32, an imaging unit 33, and a second heating unit 34. The first heating unit 30, the pre-treatment head 31, the recording head 32, the imaging unit 33, and the second heating unit 34 are disposed in this order in a conveying direction D1 of the sheet P.

The first heating unit 30 heats a first conveying unit 24 included in the conveying unit 2. Note that the first conveying unit 24 will be described below. Further, the first heating unit 30 also heats the sheet P before the pre-treatment liquid and the ink are ejected (pre-heating). The heating temperature of the first heating unit 30 is favorably 30° C. or more and 50° C. or less.

The pre-treatment head 31 houses the pre-treatment liquid. The pre-treatment head 31 ejects the pre-treatment liquid onto the sheet P. As each of the ejection amount of the pre-treatment liquid ejected from the pre-treatment head 31 and the ejection amount of the pre-treatment resin ejected from the pre-treatment head 31, the amount described in the <Pre-treatment liquid> is suitable.

The recording head 32 houses the ink. The recording head 32 ejects the ink onto the sheet P. In detail, the recording head 32 ejects the ink onto at least part of the region of the sheet P where the pre-treatment liquid has been ejected. The ejection amount of the ink to be ejected from the recording head 32 is favorably 0.1 pL or more and 20 pL or less per pixel.

The imaging unit 33 images the image formed on the sheet P in order to determine what the gloss value of the image formed on the sheet P is.

The second heating unit 34 heats the sheet P onto which the pre-treatment liquid and the ink has been ejected to dry the pre-treatment liquid and the ink. The heating temperature of the second heating unit 34 is favorably 70° C. or more and 90° C. or less.

The conveying unit 2 conveys the sheet P from the paper feed unit 1 to the output unit 4. In detail, the conveying unit 2 includes a plurality of conveying guides 21, a plurality of conveying roller pairs 22, a resist roller pair 23, a first conveying unit 24, and a second conveying unit 25. The conveying guide 21 forms the conveying path of the sheet P. The conveying roller pair 22 conveys the sheet P along the conveying path. The resist roller pair 23 adjusts the timing of conveying the sheet P to the first conveying unit 24 in accordance with the timing at which the image forming unit 3 ejects the pre-treatment liquid and the ink. The first conveying unit 24 faces the first heating unit 30, the pre-treatment head 31, the recording head 32, the imaging unit 33, and the second heating unit 34. The first conveying unit 24 conveys the sheet P in the conveying direction D1 in the region immediately below the first heating unit 30, the pre-treatment head 31, the recording head 32, the imaging unit 33, and the second heating unit 34. The second conveying unit 25 conveys the sheet P fed out from the first conveying unit 24 in a conveying direction D2 toward the output unit 4.

The output unit 4 outputs the sheet P to the outside of the casing 100*a*. The output unit 4 includes an output tray 41 and an output roller pair 42. The output roller pair 42 feeds the sheet P to the output tray 41.

The operation panel unit 6 receives an instruction from a user. The operation panel unit 6 includes a display unit 61 and an operation button 62. The display unit 61 displays results of various types of processing. The operation button 62 includes a start button, an arrow key, and a numeric key. The start button is a button for causing the inkjet recording apparatus 100 to execute various functions (processing). The arrow key is a button for changing the selection target. The numeric key is a button for inputting a numerical value.

Figure 2:
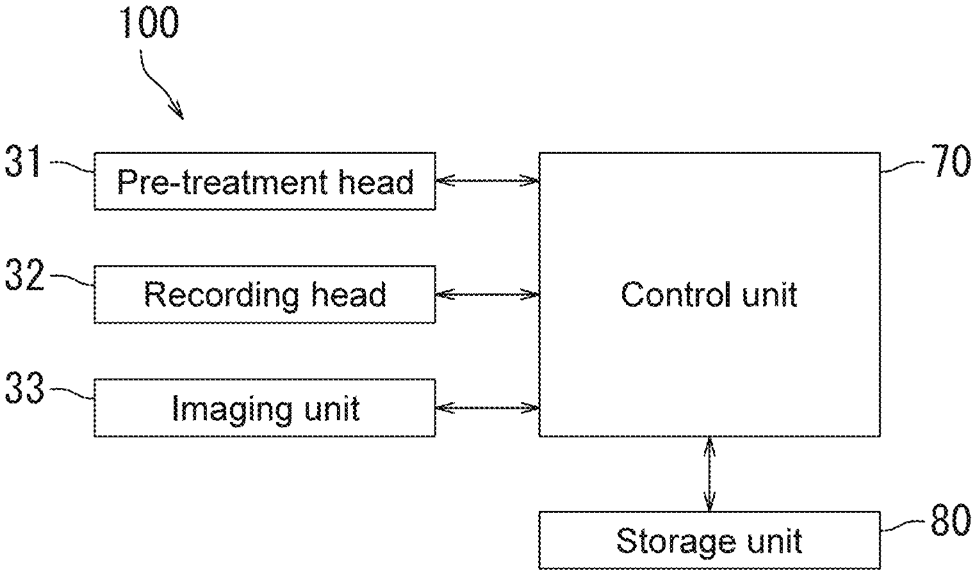
FIG. 2 is a block diagram showing an example of a circuit configuration of the inkjet recording apparatus.

Next, a circuit configuration of the inkjet recording apparatus 100 will be described with reference to FIG. 2 in addition to FIG. 1. FIG. 2 is a block diagram showing an example of the circuit configuration of the inkjet recording apparatus 100.

As shown in FIG. 2, the inkjet recording apparatus 100 includes a control unit 70 and a storage unit 80, in addition to the pre-treatment head 31, the recording head 32, and the imaging unit 33.

The storage unit 80 includes a main storage device such as a read only memory (ROM) and a random access memory (RAM). The storage unit 80 stores a computer program and various types of data.

The control unit 70 includes a processor such as a central processing unit (CPU). The control unit 70 executes the computer program stored in the storage unit 80, thereby controlling the operation of each element of the inkjet recording apparatus 100. Specifically, the control unit 70 controls the operation of each of the pre-treatment head 31, the recording head 32, and the imaging unit 33 constituting the image forming unit 3.

The control unit 70 determines, on the image taken by the imaging unit 33, what the gloss value of the image formed on the sheet P is. The control unit 70 then changes, in accordance with the gloss value of the image formed on the sheet P, the amount of the pre-treatment liquid to be ejected from the pre-treatment head 31. In detail, in the case where the gloss value of the image formed on the sheet P is lower than a predetermined value, the control unit 70 increases the amount of the pre-treatment liquid droplets to be ejected from the nozzle of the pre-treatment head 31 as compared with the case where the gloss value is the predetermined value. In the case where the gloss value of the image formed on the sheet P is higher than the predetermined value, the control unit 70 decreases the amount of the pre-treatment liquid droplets to be ejected from the nozzle of the pre-treatment head 31 as compared with the case where the gloss value is the predetermined value.

The inkjet recording apparatus 100 according to the first embodiment, which is an example of the inkjet recording apparatus according to the present disclosure, has been described above with reference to the drawings. However, the present disclosure is not limited to the above-mentioned embodiment, and can be implemented in various aspects without departing from the essence of the present disclosure. Further, various inventions can be formed by appropriately combining the plurality of components disclosed in the above-mentioned embodiment. For example, some components may be deleted from all of the components shown in the embodiment. The drawings schematically show mainly the respective components for ease of understanding, and the number of each component shown in the drawings and the like differ from the actual ones in some cases due to the convenience of creating the drawings. Further, the components shown in the above-mentioned embodiment are merely examples and are not particularly limited, and various modifications can be made without substantially departing from the effects of the present disclosure.

For example, although the inkjet recording apparatus 100 has been an apparatus that records an image using a single color ink in the above-mentioned embodiment, the present disclosure is not limited thereto. The inkjet recording apparatus 100 may be an apparatus that records a color image using multiple color inks.

Further, although the recording medium has been the sheet P that is cut paper in the above-mentioned embodiment, the present disclosure is not limited thereto. The recording medium may be a continuous film.

Further, although the imaging unit 33 has imaged the image formed on the sheet P in the above-mentioned embodiment, the present disclosure is not limited thereto. The imaging unit 33 may images the sheet P before the pre-treatment liquid and the ink are ejected. In this case, the imaging unit 33 is provided upstream of the pre-treatment head 31 in the conveying direction D1 of the sheet P. Further, in this case, the control unit 70 changes, in accordance with the gloss value of the sheet P before image formation, the amount of the pre-treatment liquid to be ejected from the pre-treatment head 31.

Further, although the control unit 70 has changed, in accordance with the gloss value of the image formed on the sheet P, the amount of the pre-treatment liquid to be ejected from the pre-treatment head 31 in the above-mentioned embodiment, the present disclosure is not limited. When the operation panel unit 6 receives an instruction of selecting the gloss mode from a user, the control unit 70 may increase, on the basis of the instruction, the amount of the pre-treatment liquid to be ejected from the pre-treatment head 31 by a predetermined amount (e.g., the amount of the pre-treatment liquid stored in the storage unit 80 in advance).

Second Embodiment: Inkjet Recording Method

Next, an inkjet recording method according to a second embodiment of the present disclosure will be described. The inkjet recording method according to the present disclosure includes: a pre-treatment step of ejecting a pre-treatment liquid onto a recording medium; and an ink ejection step of ejecting an ink onto at least part of a region of the recording medium onto which the pre-treatment liquid has been ejected. The recording medium has a surface roughness of 0.3 μm or more and 0.4 μm or less. The pre-treatment liquid includes an aqueous medium and a pre-treatment resin. The content ratio of the pre-treatment resin in the pre-treatment liquid is 10 mass % or more and 30 mass % or less. The inkjet recording method according to the present disclosure is capable of forming an image that has a high gloss value and contrast ratio and excellent adhesion to a recording medium, for the same reason as that described in the first embodiment. The inkjet recording method according to the present disclosure is carried out using, for example, the inkjet recording apparatus according to the first embodiment. Note that since the recording medium, the pre-treatment liquid, and the ink used in the second embodiment and the configuration of the inkjet recording apparatus that can be used in the second embodiment are similar to those in the first embodiment, description thereof is omitted.

EXAMPLES

Examples of the present disclosure will be described below. However, the present disclosure is not limited to the following Examples.

<Resin Dispersion Liquid>

Commercially available resin dispersion liquids to be used for preparing a pre-treatment liquid are shown below.

Resin dispersion liquid A: "SUPERFLEX (registered trademark) 470" manufactured by DKS Co. Ltd. (content ratio of resin in resin dispersion liquid: 38 mass %, resin: non-yellowing isocyanate carbonate self-emulsifying urethane resin, polarity of resin: anionic, glass transition temperature of resin: −31° C., thermal softening temperature of resin: 97° C., thermal melting temperature of resin: 138° C.)

Resin dispersion liquid B: "SUPERFLEX (registered trademark) 130" manufactured by DKS Co. Ltd. (content ratio of resin in resin dispersion liquid: 35 mass %, resin: non-yellowing isocyanate ether self-emulsifying urethane resin, polarity of resin: anionic, glass transition temperature of resin: 101° C., thermal softening temperature of resin: 174° C., thermal melting temperature of resin: 216° C.)

<Preparation of Pre-Treatment Liquid>

Pre-treatment liquids (P1) to (P8) were prepared by mixing the respective components such that the compositions are shown in the following Table 1.

TABLE 1

| | | Pre-treatment liquid | | | | | | | |
|---|---|---|---|---|---|---|---|---|---|
| | | P1 | P2 | P3 | P4 | P5 | P8 | P6 | P7 |
| | | Resin content ratio [%] | | | | | | | |
| | | 5 | 10 | 15 | 20 | 25 | 26 | 30 | 35 |
| Composition [%] | Resin dispersion liquid A | 13.16 | 26.32 | 39.47 | 52.63 | 65.79 | — | 78.95 | 92.11 |
| | Resin dispersion liquid B | — | — | — | — | — | 71.43 | — | — |
| | PG | 12.5 | 12.5 | 12.5 | 12.5 | 5.0 | 5.0 | 5.0 | 5.0 |
| | BTG | 4.0 | 4.0 | 4.0 | 4.0 | 2.0 | 2.0 | 2.0 | 2.0 |
| | Surfactant | 0.1 | 0.1 | 0.1 | 0.1 | 0.1 | 0.1 | 0.1 | 0.1 |
| | Water | Remaining amount | Remaining amount | Remaining amount | Remaining amount | Remaining amount | Remaining amount | Remaining amount | Remaining amount |
| | Total | 100.0 | 100.0 | 100.0 | 100.0 | 100.0 | 100.0 | 100.0 | 100.0 |

Abbreviations used in Table 1 will be shown below.

%: mass %

PG: propylene glycol

BTG: butyl triglycol

Surfactant: silicone surfactant ("SILFACE (registered trademark) SAG503A" manufactured by Nissin Chemical Co., Ltd.)

Resin content ratio: content ratio of the pre-treatment resin in the pre-treatment liquid. Note that the content ratio of the pre-treatment resin in the pre-treatment liquid was calculated from the formula "Content ratio of pre-treatment resin in pre-treatment liquid=content ratio of resin dispersion liquid in pre-treatment liquid× content ratio of resin in resin dispersion liquid".

-: the corresponding component is not used

<Preparation of Pigment Dispersion DW>

A pigment dispersion DW to be used for preparing an ink W was prepared by the following method. 75 parts by mass of a pigment dispersion resin ("DISPERBYK-190" manufactured by BYK Japan KK, an aqueous solution of a polyether-modified styrene-maleic anhydride copolymer, non-volatile content: 40 mass %) and 425 parts by mass of ion exchanged water were mixed to obtain a mixed solution I. The mixed solution I and 500 parts by mass of a white pigment ("JR-804" manufactured by TAYCA Co., Ltd.) were mixed at a stirring speed of 5000 rpm for 1 one using a homodisper to obtain a mixed solution II. The vessel of a bead mill (manufactured by NIPPON COKE & ENGINEERING. CO., LTD.) was filled with media (zirconia beads having a diameter of 0.2 mm) Such that the filling rate would be 80 volume % with respect to the volume of the vessel. The mixed solution II was further added to this vessel and the content of the vessel was dispersed using the bead mill. In this way, the pigment dispersion DW was obtained.

<Preparation of Ink W>

30 parts by mass of propylene glycol, 10 parts by mass of butyl triglycol, 1 part by mass of an acetylene glycol surfactant ("SURFYNOL (registered trademark) 104" manufactured by Nissin Chemical Co., Ltd.), 0.5 parts by mass of a 1% aqueous sodium hydroxide solution, 10 parts by mass of the above-mentioned pigment dispersion DW, a binder resin dispersion liquid ("SUPERFLEX (registered trademark) 130" manufactured by DKS Co. Ltd., binder resin content ratio: 35 mass %), and water were added to a beaker. The addition amount of the binder resin dispersion liquid was set such that the addition amount of the binder resin would be 5 parts by mass. The addition amount of water was set such that the total amount of the mixture in the beaker would be 100 parts by mass. The content of the beaker was mixed at a stirring speed of 400 rpm using a stirrer ("Three-One Motor BL-600" manufactured by Shinto Scientific Co., Ltd.) to obtain a mixed solution. The mixed solution was filtered using a filter (pore size of 5 μm) to remove foreign substances and coarse particles contained in the mixed solution. In this way, the ink W was obtained.

<Preparation of Film>

Films (M1) to (M6) shown in the following Table 2 were prepared. In detail, the films (M1) to (M5) having the surface roughness shown in Table 2 were obtained by processing the surface of a polyester film ("Lumirror (registered trademark) S010" manufactured by TORAY INDUSTRIES, INC.) using sandblasting. Further, the film (M6) having the surface roughness shown in Table 2 was obtained by processing the surface of a polypropylene film ("TORAYFAN (registered trademark) 2548" manufactured by TORAY INDUSTRIES, INC.) using sandblasting. Note that for the sandblasting process, brown fused alumina was used as an abrasive. The surface roughness of each film was adjusted to the value shown in Table 2 by changing the size of the abrasive to be used for sandblasting (specifically, grain size number of the abrasive defined in Japanese Industrial Standard (JIS) R 6001). The larger the grain size of the abrasive (the smaller the grain size number), the larger the value of the surface roughness of the film. For example, an abrasive with the grain size number F220 was used for the sandblasting process of M1.

TABLE 2

| | Film | Surface roughness [μm] |
|---|---|---|
| M1 | Sandblasted product of Lumirror S010 | 0.30 |
| M2 | Sandblasted product of Lumirror S010 | 0.40 |
| M3 | Sandblasted product of Lumirror S010 | 0.25 |
| M4 | Sandblasted product of Lumirror S010 | 0.45 |
| M5 | Sandblasted product of Lumirror S010 | 0.10 |
| M6 | Sandblasted product of TORAYFAN 2548 | 0.30 |

Abbreviations used in Table 2 will be shown below.

Lumirror S010: biaxially oriented PET film ("Lumirror (registered trademark) S010" manufactured by TORAY INDUSTRIES, INC.)

TORAYFAN 2548: OPP film ("TORAYFAN (registered trademark) 2548" manufactured by TORAY INDUSTRIES, INC.)

The surface roughness (Ra) shown in Table 2 was measured at a lens magnification of 100 times using a confocal microscope ("OPTELICS (registered trademark) HYBRID+" manufactured by Lasertec Corporation). The surface roughness Ra was analyzed after filtering with a median filter.

<Evaluation>

[Evaluation Device]

A one-pass inkjet recording apparatus (tester manufactured by KYOCERA Document Solutions Inc.) was used as an evaluation device. The evaluation device included a conveying unit, a pre-treatment head, and a recording head. In the evaluation device, the pre-treatment head and the recording head were provided parallel to each other respectively on the upstream side and on the downstream side in the conveying direction of the film. The recording head of the evaluation device was filled with the ink W. The recording head was set to an applied voltage of 21 V, a drive frequency of 20 kHz, a head temperature of 32° C., and a resolution of 1200 dpi. When forming an image using the evaluation device, the conveying unit was heated to 40° C. in advance. Further, when forming an image using the evaluation device, the conveying speed of the film was set to 30 m/min.

[Preparation of Inkjet Recording Apparatus]

The pre-treatment head included in the above-mentioned evaluation device was filled with the pre-treatment liquid shown in the following Table 3. The ejection amount per pixel of the pre-treatment head was set to the amount shown in Table 3. The film shown in Table 3 was set in the evaluation device. In this way, inkjet recording apparatuses (A-1) to (A-10) and (B-1) to (B-9) were obtained. Note that "%" and the "resin content ratio" used in Table 3 are respectively synonymous with "%" and the "resin content ratio" used in Table 1. "-" used in Table 3 indicates that no pre-treatment liquid is used.

TABLE 3

| | | Pre-treatment liquid | | | Film | |
|---|---|---|---|---|---|---|
| | Inkjet recording apparatus | Type | Resin content ratio [%] | Ejection amount [pL] | Type | Surface roughness [μm] |
| Example 1 | A-1 | P2 | 10 | 2 | M1 | 0.30 |
| Example 2 | A-2 | P2 | 10 | 3 | M1 | 0.30 |
| Example 3 | A-3 | P2 | 10 | 2 | M2 | 0.40 |
| Example 4 | A-4 | P3 | 15 | 2 | M1 | 0.30 |
| Example 5 | A-5 | P4 | 20 | 2 | M1 | 0.30 |
| Example 6 | A-6 | P4 | 20 | 1 | M1 | 0.30 |

TABLE 3-continued

| | Inkjet recording apparatus | Pre-treatment liquid Type | Resin content ratio [%] | Ejection amount [pL] | Film Type | Surface roughness [μm] |
|---|---|---|---|---|---|---|
| Example 7 | A-7 | P5 | 25 | 2 | M1 | 0.30 |
| Example 8 | A-8 | P8 | 25 | 2 | M1 | 0.30 |
| Example 9 | A-9 | P5 | 25 | 2 | M6 | 0.30 |
| Example 10 | A-10 | P6 | 30 | 2 | M1 | 0.30 |
| Comparative Example 1 | B-1 | P7 | 35 | 2 | M1 | 0.30 |
| Comparative Example 2 | B-2 | P7 | 35 | 1 | M1 | 0.30 |
| Comparative Example 3 | B-3 | — | — | — | M1 | 0.30 |
| Comparative Example 4 | B-4 | P1 | 5 | 2 | M1 | 0.30 |
| Comparative Example 5 | B-5 | P1 | 5 | 3 | M1 | 0.30 |
| Comparative Example 6 | B-6 | P2 | 10 | 2 | M3 | 0.25 |
| Comparative Example 7 | B-7 | P2 | 10 | 3 | M3 | 0.25 |
| Comparative Example 8 | B-8 | P2 | 10 | 2 | M4 | 0.45 |
| Comparative Example 9 | B-9 | P2 | 10 | 2 | M5 | 0.10 |

The gloss value, the contrast ratio, and the base material adhesion of the evaluation image were evaluated by the following method. The evaluation results are shown in the following Table 4.

[Formation of Evaluation Image]

A solid image of the pre-treatment liquid was formed on the film using each of the inkjet recording apparatuses (A-1) to (A-10) and (B-1) to (B-9), and a solid image of the ink was formed on the solid image of the pre-treatment liquid. Subsequently, the film on which the image had been formed was dried at 80° C. for 120 seconds using a hot air dryer. In this way, the image (evaluation image) formed on the film (evaluation film) was obtained using each inkjet recording apparatus.

[Gloss Value]

The gloss value of the evaluation image was measured under the condition of incidence/reflection=60°/60° using a gloss meter (“Elcometer J480T” manufactured by Elcometer Limited). The gloss value was determined in accordance with the following criteria. In the case where the evaluation was poor, “NG” was marked in the following Table 4.

(Criteria for Gloss Value)

Particularly good: the gloss value is 80 or more.

Good: the gloss value is 40 or more and less than 80.

Poor: the gloss value is less than 40.

[Contrast Ratio]

The K value of the evaluation image was measured while the evaluation film was placed on contrast ratio test paper. Further, the K value of the contrast ratio test paper itself was measured. For the measurement of the K value, a spectrodensitometer (“FD-5” manufactured by Konica Minolta, Inc.) was used. The contrast ratio of the evaluation image was obtained from the formula “Contrast ratio={1−(K value of evaluation image/K value of contrast ratio test paper)}×100”. The contrast ratio was determined in accordance with the following criteria. In the case where the evaluation was poor, “NG” was marked in the following Table 4.

(Criteria for Contrast Ratio)

Particularly good: the contrast ratio is 84.0% or more.

Favorable: the contrast ratio is 80.0% or more and less than 84.0%.

Poor: the contrast ratio is less than 80.0%.

[Base Material Adhesion]

Six cuts with a grid pattern (checkerboard pattern) at intervals of 1 mm were made vertically and horizontally on the evaluation image on the evaluation film to form 25 squares with sides of 1 mm. An adhesive tape was attached to each evaluation image with the cuts, and then the adhesive tape was peeled off at the angle of approximately 60 degrees (peeling treatment). The adhesive tape was peeled off at a speed where the time from the start of peeling to the end of peeling was one second. After the peeling treatment, the evaluation film was observed. The base material adhesion was determined in accordance with the following criteria.

(Criteria for Base Material Adhesion)

A (Particularly good): after the peeling treatment, no peeling was observed in the evaluation image.

B (Good): after the peeling treatment, 1 or more and 3 or less squares of peeling were observed in the evaluation image.

C (Poor): after the peeling treatment, 4 or more and 6 or less squares of peeling were observed in the evaluation image.

D (Particularly poor): after the peeling treatment, 7 or more squares of peeling were observed in the evaluation image.

TABLE 4

| | Inkjet recording apparatus | Evaluation Gloss value | Contrast ratio [%] | Base material adhesion |
|---|---|---|---|---|
| Example 1 | A-1 | 60 | 84.0 | A |
| Example 2 | A-2 | 80 | 82.0 | A |
| Example 3 | A-3 | 50 | 85.0 | A |
| Example 4 | A-4 | 70 | 83.0 | A |

TABLE 4-continued

| | Inkjet recording apparatus | Evaluation | | |
|---|---|---|---|---|
| | | Gloss value | Contrast ratio [%] | Base material adhesion |
| Example 5 | A-5 | 80 | 82.0 | A |
| Example 6 | A-6 | 60 | 84.0 | A |
| Example 7 | A-7 | 85 | 81.0 | A |
| Example 8 | A-8 | 84 | 81.0 | A |
| Example 9 | A-9 | 84 | 81.0 | B |
| Example 10 | A-10 | 90 | 80.0 | A |
| Comparative Example 1 | B-1 | 100 | 78.0 (NG) | A |
| Comparative Example 2 | B-2 | 95 | 79.0 (NG) | A |
| Comparative Example 3 | B-3 | 19 (NG) | 88.0 | D |
| Comparative Example 4 | B-4 | 28 (NG) | 86.0 | A |
| Comparative Example 5 | B-5 | 38 (NG) | 85.0 | A |
| Comparative Example 6 | B-6 | 70 | 83.0 | C |
| Comparative Example 7 | B-7 | 75 | 82.5 | C |
| Comparative Example 8 | B-8 | 38 (NG) | 86.0 | A |
| Comparative Example 9 | B-9 | 95 | 79.0 (NG) | D |

The content ratio of the resin in the pre-treatment liquid (more specifically, the pre-treatment liquid (P7)) included in each of the inkjet recording apparatuses (B-1) and (B-2) exceeded 30 mass %. The evaluation of the contrast ratio of the image formed by each of the inkjet recording apparatuses (B-1) and (B-2) was poor.

The inkjet recording apparatus (B-3) did not use the pre-treatment liquid. The evaluation of the gloss value of the image formed by the inkjet recording apparatus (B-3) was poor, and the evaluation of the base material adhesion was particularly poor.

The content ratio of the resin in the pre-treatment liquid (more specifically, a pre-treatment liquid (P1)) included in each of the inkjet recording apparatuses (B-4) and (B-5) was less than 10 mass %. The evaluation of the gloss value of the image formed by each of the inkjet recording apparatus (B-4) and (B-5) was poor.

The surface roughness of the recording medium (more specifically, each of the films (M3) and (M5)) included in the inkjet recording apparatuses (B-6), (B-7), and (B-9) was less than 0.30 μm. The evaluation of the base material adhesion of the image formed by each of the inkjet recording apparatuses (B-6) and (B-7) was poor. The evaluation of the base material adhesion of the image formed by the inkjet recording apparatus (B-9) was particularly poor, and the evaluation of the contrast ratio was poor.

The surface roughness of the recording medium (more specifically, the film (M4)) included in the inkjet recording apparatus (B-8) exceeded 0.40 μm. The evaluation of the gloss value of the image formed by the inkjet recording apparatus (B-8) was poor.

On the other hand, as shown in table 3, each of the inkjet recording apparatuses (A-1) to (A-10) included a pre-treatment head and a recording head. The surface roughness of the recording medium (more specifically, each of the films (M1), (M2), and (M6)) was 0.30 μm or more and 0.40 μm or less. The pre-treatment liquid (more specifically, each of the pre-treatment liquids (P2) to (P6) and (P8)) included an aqueous medium and a resin, and the content ratio of the resin in the pre-treatment liquid was 10 mass % or more and 30 mass % or less. Each of the inkjet recording apparatuses (A-1) to (A-10) were capable of forming an image that has a high gloss value and contrast ratio and excellent base material adhesion.

It should be understood by those skilled in the art that various modifications, combinations, sub-combinations and alterations may occur depending on design requirements and other factors insofar as they are within the scope of the appended claims or the equivalents thereof.

What is claimed is:

1. An inkjet recording apparatus, comprising:

a pre-treatment head that ejects a pre-treatment liquid onto a recording medium; and a recording head that ejects an ink onto at least part of a region of the recording medium onto which the pre-treatment liquid has been ejected, wherein the recording medium has a surface roughness of 0.30 μm or more and 0.40 μm or less, the pre-treatment liquid includes an aqueous medium and a resin, a content ratio of the resin in the pre-treatment liquid is 10 mass % or more and 30 mass % or less.

2. The inkjet recording apparatus according to claim 1, wherein the resin included in the pre-treatment liquid is a urethane resin in a form of emulsified particles.

3. The inkjet recording apparatus according to claim 1, wherein an amount of the resin included in the pre-treatment liquid to be ejected from the pre-treatment head is 0.2 pL or more and 0.6 pL or less per pixel.

4. The inkjet recording apparatus according to claim 1, wherein the pre-treatment liquid includes no pigment and the ink includes a white pigment.

5. The inkjet recording apparatus according to claim 1, wherein the recording medium is a non-absorbent recording medium.

6. The inkjet recording apparatus according to claim 1, further comprising a control unit that controls an operation of the pre-treatment head, the control unit changing an amount of the pre-treatment liquid to be ejected from the pre-treatment head, in accordance with a gloss value of an image formed on the recording medium.

7. An inkjet recording method, comprising:

a pre-treatment step of ejecting a pre-treatment liquid onto a recording medium; and an ink ejection step of ejecting an ink onto at least part of a region of the recording medium onto which the pre-treatment liquid has been ejected, wherein the recording medium has a surface roughness of 0.3 μm or more and 0.4 μm or less, the pre-treatment liquid includes an aqueous medium and a resin, a content ratio of the resin in the pre-treatment liquid is 10 mass % or more and 30 mass % or less.

* * * * *